United States Patent [19]

Hester

[11] 3,925,639

[45] Dec. 9, 1975

[54] METHOD AND APPARATUS FOR READING BAR CODED DATA WHEREIN A LIGHT SOURCE IS PERIODICALLY ENERGIZED

[75] Inventor: Gerald Hester, Santa Ana, Calif.

[73] Assignee: MSI Data Corporation, Costa Mesa, Calif.

[22] Filed: Mar. 25, 1974

[21] Appl. No.: 454,585

[52] U.S. Cl. ............ 235/61.11 E; 250/561; 250/570

[51] Int. Cl.$^2$ ............................................ G06K 7/10

[58] Field of Search ......... 235/61.11 E; 340/146.32; 250/555, 205, 561, 570

[56] References Cited

UNITED STATES PATENTS

| | | | |
|---|---|---|---|
| 3,501,623 | 3/1970 | Robinson | 235/61.11 E |
| 3,716,699 | 2/1973 | Eckert, Jr. et al. | 235/61.11 E |
| 3,736,410 | 5/1973 | Ragland et al. | 235/61.11 E |

OTHER PUBLICATIONS

IBM Tech. Disc. Bull. "Data Coding and Device for Reading Corresponding Codes" by Jones; Vol. 14, No. 3, 8/71; pp. 909–911.

*Primary Examiner*—Stanley M. Urynowicz, Jr.
*Attorney, Agent, or Firm*—Edward J. DaRin

[57] ABSTRACT

A method and apparatus for reading bar coded data for entry into a data collection system. The data is read by an optical wand and the data signals are processed by D.C. coupled, operational amplifiers to provide binary coded signals representative of the coded data. The light source is periodically energized and maintained energized only in response to the sensing of a reflective surface.

24 Claims, 4 Drawing Figures

METHOD AND APPARATUS FOR READING BAR CODED DATA WHEREIN A LIGHT SOURCE IS PERIODICALLY ENERGIZED

This invention relates to a data collection system and more particularly to a method and apparatus for reading bar coded data for entry into a data collection system.

PRIOR ART

At the present time there is in use data collection systems for inventory control or electronic ordering in retail outlets such as supermarkets and the like. These systems are generally portable devices and the entry of the data into the system is accomplished by the operator reading the data from an item or product on a shelf and operating a keyboard to enter the data read. One such portable data collection system is described in U.S. Pat. No. 3,771,132. Portable devices of the type disclosed in the aforementioned patent, in order to be commercially feasible must be battery (D.C.) powered. The system described in the above referenced patent is a battery powered data collection system wherein the information is entered into the system by means of an operator actuating a hand-held keyboard. As in all human operated devices, the opportunity for errors arise and errors have been introduced into the data collection system as a result of the operator's improper actuation of the keyboard. In addition, a finite amount of time is required for the operator to effect the necessary entry into the system. To reduce or eliminate these operator errors, codes have been proposed to be printed on the products or the shelves storing the products subject to the inventory control. Labels having coded data recorded thereon have been proposed for the shelves storing the products to be inventoried so that they may be read automatically by means of a portable optical sensor. These types of codes are characterized as bar codes and are adapted to be read optically by passing an optical sensing wand over the bar coded item or upon the production of relative motion between the bar coded item and a sensor. The bar codes are arranged with a unique pattern for identifying an item or product.

A bar code consists of a series of dark and light bars of varying widths and with the information encoded in terms of the sequence of light and dark bars. When this bar code is read by an optical scanner, for example, the time required and the error rate experienced by the keyboard entry are greatly reduced.

There are two problems with optical scanners as they are presently constructed for use in a portable data collection system. First, a truly portable data collecting device must be battery powered. An optical scanner requires a source of radiation to illuminate the bar coded data and this would place a significant drain on the battery. A second problem is that photo detectors or sensors, such as photo diodes, photo transistors, or PIN diodes, exhibit leakage (or dark) currents that vary significantly between units and with temperature changes. Regardless of the manner in which the photo detector is incorporated in a circuit, the result is that an unknown D.C. offset voltage is produced that may be on the order of a magnitude or more greater than a data signal. This D.C. offset could be blocked by a series capacitor so that only an information containing alternating current (A.C.) signal is passed. This would be satisfactory if there is no $A_0$ (D.C.) term in the Fourier series computed for the signal produced when the bar coded data is scanned. A D.C. component might be inherent in the code itself if, for example, the area of light bars and dark bars were not equal. More significant with hand-held scanners is the manner in which the scanner is employed. An operator would position the scanner on the light surface (reflective) ahead of the bar code and then sweep across the coded area relatively quickly. The result is a relatively long period of a light signal before alternating dark and light signals are received. This will produce an initial signal level of indefinite duration that cannot be supported by a blocking capacitor. To use this method, complex circuits that detect peaks and establish varying slicing levels must be employed.

DISCLOSURE OF THE INVENTION

The present invention provides an improved method and apparatus for reading bar coded data that may be readily incorporated into prior art data collection systems and allows the coded data to be in microseconds. In particular, the apparatus for reading bar coded data into a data collection system in accordance with the present invention is applicable to battery powered systems and reduces the problem of battery drain due to the requirement of a light source in the optical scanner to a minimum. In addition, the problem of varying direct current (D.C.) offset voltages which are produced by a photo detector is solved by simple signal processing circuitry and enhances their margins. Specifically, the problem of excessive power consumption, or battery drain, is solved by the periodic pulsing of a light source for a scanner at a relatively high rate to minimize the power requirements and then interrogate the output of the optical scanner to determine the reflective characteristic of the surface undergoing sensing. The results of the interrogation controls the energization or de-energization of the light source to reduce power drain to an absolute minimum and yet allows reliable, high speed reading of the bar coded information. This technique allows a simple solution to the problem of D.C. offset voltages by maintaining D.C. coupling throughout, thereby circumventing the varying thresholds that are encountered when alternating current (A.C.) coupling is employed.

From a broad method standpoint, the method of optically reading bar coded data includes the steps of producing relative movement between bar coded data and an optical scanner for producing electrical signals representative of the sensed binary bits contained within the bar coded data. The sensor includes a light source and a light sensor for receiving the light rays of the light source that are reflected from the bar coded data. The method further includes maintaining the light source normally dark and periodically energizing the light source at a preselected high rate and then determining the reflective character of the surface exposed to the sensor and if it is determined that it is a nonreflective surface, de-energizing the light source. Alternatively, if a reflective surface is sensed, the light source is maintained in energization for generating the electrical signals representative of the scanned bar coded data while the light source is energized.

From a structural standpoint, the apparatus for optically reading bar coded data comprises optical sensing means for producing electrical signals representative of the optical characters of the surface presented thereto upon the production of relative movement between the surface and the sensing means. The sensing means has a normally de-energized light source and a light sensor for receiving the light rays from the light source that are reflected from the surface by a sensor. The sensor's electrical signals includes an unknown D.C. offset voltage. A first amplifying circuit means is coupled to be responsive to the signals from the light sensor including the D.C. offset voltages. A second amplifier means is coupled to receive the signals from the first amplifying means and providing the output signals corresponding thereto for selected periods. Differential amplifier circuit means is coupled to be responsive to the output signals from both the first and second amplifier means and providing the output signals representative of the reflective characteristics of the surface. Switching circuit control means is coupled to the light source for energizing the light source for a preselected time interval and simultaneously decoupling the first and second amplifying means during the interval the light source is energized to thereby compensate for any zero shift.

These and other features of the present invention may be more fully appreciated when considered in the light of the following specification and drawings, in which.

Figure 2:
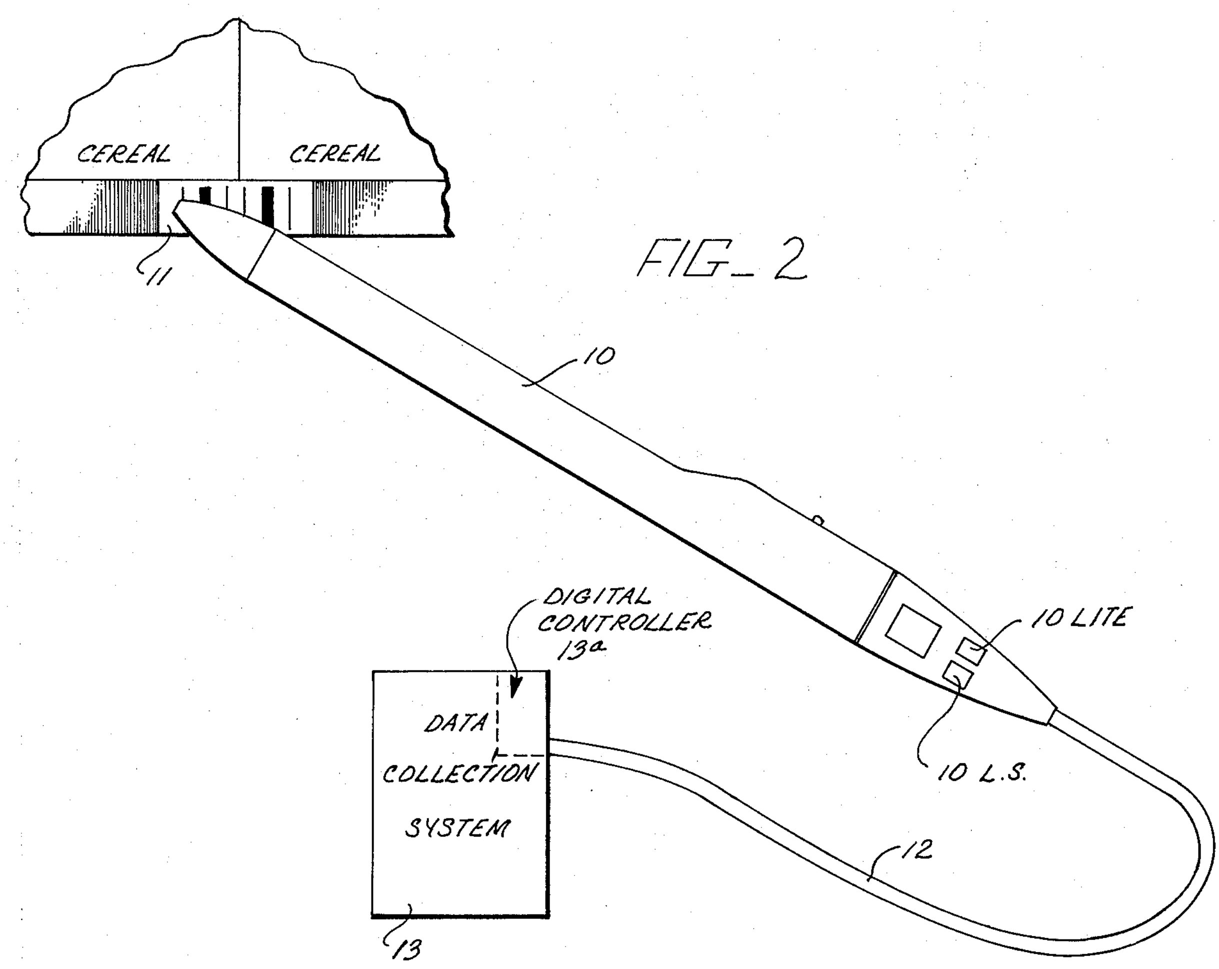
FIG. 2 is a diagrammatic view of an optical wand employed with a data collection system for reading the shelf arranged with bar coded data as illustrated in FIG. 1.

Now referring to the drawings, the present invention will be described in detail. The present invention will be described as it may be incorporated into a portable, direct current (D.C.) powered data collection system of the type disclosed in U.S. Pat. No. 3,771,132. It should be understood that the invention does not comprehend the structure of the optical scanning device that is employed for sensing the bar coded data. Such optical sensing apparatus is presently commercially available. One source for a portable optical wand that may be used for reading bar coded data is available from Welch Allyn Co. through its Industrial Products Division of Skaneatelas Falls, New York. It should also be noted that apparatus of this type is disclosed in the patent literature and one such disclosure is found in U.S. Pat. No. 3,417,234. For the purposes of the present invention, it is sufficient that such wands are known in the art and are commercially available. These wands generally comprise a light source and a light sensor arranged within the wand housing with a cable coupling the light sensor signals to the data collection system. One such sensing wand 10 is illustrated in FIG. 2 and may have a light source and a light sensor mounted in one extremity of the wand housing adjacent to the cable end thereof. The light rays from the light source are concentrated and guided by suitable optical elements to exit from the opposite end of the housing to illuminate the bar coded data on a label, such as the label 11. Any light from the light source that is reflect4d from the label 11 is also guided through the inside of the wand housing so as to impinge upon the light sensor. The signals generated by the light sensor are then coupled by means of the cable 12 to the data collection system, generally identified by the reference numeral 13 and in particular a digital controller 13A therefor.

At this point, it should be noted that the light source that is utilized for the purposes of the present invention must have a fast response time so that it precludes the use of a light source having incandescent filaments. Light emitting diodes that have the required response time for use in wand 10 are readily available commercially and are well known. It should be noted, however, that whenever the terms "light source" or "light rays" are employed in conjunction with the description and claims of the present invention that the term is not restricted to visible light as the radiation from the light source may be in the infrared region.

Figure 1:
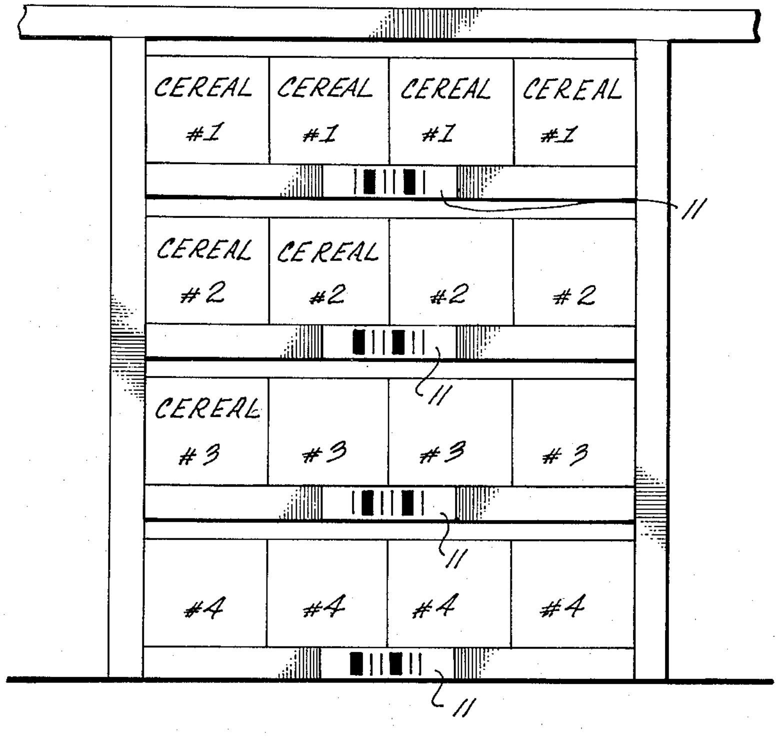
FIG. 1 is a diagrammatic illustration of a shelf in a retail outlet storing a number of brands of a particular product wherein the shelves include a label having bar coded data recorded thereon for indentifying the product.

It is important to keep in mind that the present invention is directed to the circuits that interface and process the light wand 10 signals with the data collection system 13 for allowing the necessary data signals to be entered and processed by the system 13. Before describing the particular interfacing circuits, it is well to briefly examine the bar coded data and the method of using the wand 10 for sensing. At this point it should be recognized that the use of the wand 10 is only one example of sensing such bar coded data for portable applications. It is readily apparent that bar coded data may be sensed through the production of relative movement between the optical sensor and the object carrying the bar coded data. The bar coded data as employed for the present portable data collection system is of the general type that is identified in the art as the "Universal Product Code" which can be applied to most products sold in the grocery industry. The bar coded data illustrated in FIGS. 1 and 2 is a simplified form of the bar coded information comprising the universal products code. The bar coded data illustrated in FIGS. 1 and 2 comprises a series of dark and light bars of varying widths and the information is encoded in terms of the sequencing of these bars. One pair of these bars may represent the binary characters of one kind while a pair of different width ratios will represent a binary character of the other kind. For example, a narrow dark bar followed by a wide white space will represent the binary character 0 while a wide dark bar followed by a narrow white space will represent the opposite binary character or a binary character 1. The sensing of such a bar coded label 11 by the wand 10 will produce a series of electrical signals reading from the left to the right in accordance with the sensed light and dark bars so as to produce a train of binary coded pulses in response to the production of the relative movement between the label 11 and the wand 10.

For the purposes of sensing or determining the information that is recorded on the label 11 as the data collection system 13 may be employed for inventory control purposes in supermarkets, reference to FIGS. 1 and 2 is convenient. In FIG. 1, a portion of the shelving in a conventional supermarket is illustrated storing cereal of different brands that are offered for sale by the supermarket. As illustrated in FIG. 1, cereals of the same brand are stored on the same shelf. For this purpose, brand No. 1 is illustrated on the topmost shelf, while brand Nos. 2, 3 and 4 are sequentially stored on the shelves below the top shelf. Each shelf is provided with a label 11 which has the bar coded information recorded thereon. The label 11 is placed on the edge of the shelf immediately below the product or cereal that is stored on the shelf. Each label 11 is data coded thereon in terms of the bar code and identifies the product such as the particular brand of cereal stored on that shelf. If, in examining the products stored on the shelves, the data system operator notes that there is a shortage of a particular brand of cereal on the shelf, or the cereal has been exhausted, for the purposes of recording this fact he can move the wand 10 over the label 11 to record the brands which are in short supply or exhausted and require reordering. To properly employ the wand 10 to read the bar coded data on the label 11, the operator should place the wand 10 against the white portion of the label 11, at the left hand extremity thereof as illustrated in FIGS. 1 and 2. He would then sweep the wand 10 across the bar code rapidly until he has read the entire label. Since the data collection system circuitry is operating at electronic speed, or very high speed, this reading or sampling routine can be repeated every few milliseconds assuring that when the wand 10 is against the label 11 it will always be detected. For the purpose of utilizing the wand 10 in a portable D.C. powered data collection system wherein the power drain on the battery is an important consideration, the sampling process or reading may be accomplished in a period measured in micro-seconds, thus substantially reducing the standby power required for the light source in the wand to a small percentage and thereby effectively employ the D.C. power for energizing the light source only when necessary.

The above description comprises the general characteristics of the signals derived from the wand 10 relative to the generation of the binary coded signals as a result of detecting the reflective and nonreflective characteristics of the bars coded on the label 11. The interfacing circuitry for processing the signals from the light sensor is arranged to provide the correct binary signal as a result of the production of relative movement between the coded data and the sensor without reference to the rate at which the relative motion is produced or the rate that the wand 10 is moved over the label 11. The binary signals generated are based on the ratio of the width of a black bar to the width of a white bar. In this respect the signal level representing the average of the ratio of black to white bars is employed to signal a binary character since the generated signal has a substantially trapezoidal wave shape. For this purpose it will be recognized that the reference signal level for the generated signal is an important consideration and a variable reference level may be introduced by the production of an unknown D.C. offset voltage that is inherent in most light sensors. In accordance with the present invention any unknown D.C. offset voltages generated are rejected or compensated for in the signal processing circuits so as to provide the correct binary coded output signals to the digital controller 13$^a$. In accordance with the present invention and as will be made more evident hereinafter, these binary coded signals are generated in terms of signals of different polarity for processing by the digital controller 13$^a$ of the data collection system 13. For this purpose direct current (D.C.) coupling is maintained through the signal processing circuits thereby circumventing any varying thresholds or reference levels encountered with alternating current (A.C.) coupled circuits.

The method that is comprehended by the present invention for the purposes of minimizing the power drain on the power source includes the steps of maintaining the light source deenergized or dark and periodically energizing the light source to determine the reflective character of the surface to which the scanner or wand 10 is presented. With the energization of the light source, a binary source is generated by the signal processing circuit interfacing the wand 10 with the data collection system 13. If a signal is generated that indicates that a nonreflective surface is presented to the wand 10, the light source is de-energized. The digital controller is constructed and defined to maintain this de-energized condition of a light source for a predetermined period after which the light is re-energized and the process is repeated. If the binary signal, however, represents the fact that the wand 10 has sensed a reflective surface, the light source will be maintained in energization as this is a signal that the bar coded information is imminent. This will occur, for example, when the wand 10 is placed adjacent the left extremity of the label 11 and since the source is maintained energized, the continued passing of the wand 10 over the label 11 will produce the required output signals representative of the bar coded data. When the wand 10 is moved off of the label 11 on the righthand extremity as illustrated in FIG. 2, the light source will be de-energized in response to the nonreflective or light absorbent characteristic of the adjacent surface of the shelf.

From the above it should be evident that a digital controller 13$^a$ is required for interrogating the binary characteristic of the signals coupled from the wand 10. One such digital controller in which the signal processing circuits of the present invention may be coupled to is the type of controller described in U.S. Pat. No. 3,771,132. Also, there is at the present time digital controllers that are constructed as micro-processors having a programmable read only memory. These micro-processors are constructed of miniature integrated circuits, or "chips," that can be readily programmed to perform the necessary routine for controlling the energization and de-energization of the light source. These micro-processors are presently in use and one such micro-processor is incorporated in a portable data collection system commercially available from MSI Data Corporation, of Costa Mesa, California. This data collection system is identified as the MSI Model 2100 system. This data collection system is also a D.C. operated system. The micro-processor in this MSI 2100 series data collection system can readily be programmed by one skilled in the art to recognize the difference between valid and invalid data and when to provide the necessary signal for energizing or deenergizing the light source. For example, invalid data may be generated when the sensing end of the wand 10 is placed at a point on the label 11 wherein the coded data appears rather than to the lefthand extremity of the label 11 for proper operation; see FIG. 2. The micro-processor system will be programmed to determine that this data is invalid or incomplete and upon the subsequent passing of the wand 10 over the label 11, the correct data will be recognized by the system 13 and processed accordingly, In our particular implementation, the label may be read in either direction, but that is not essential to the invention.

Figure 3A:
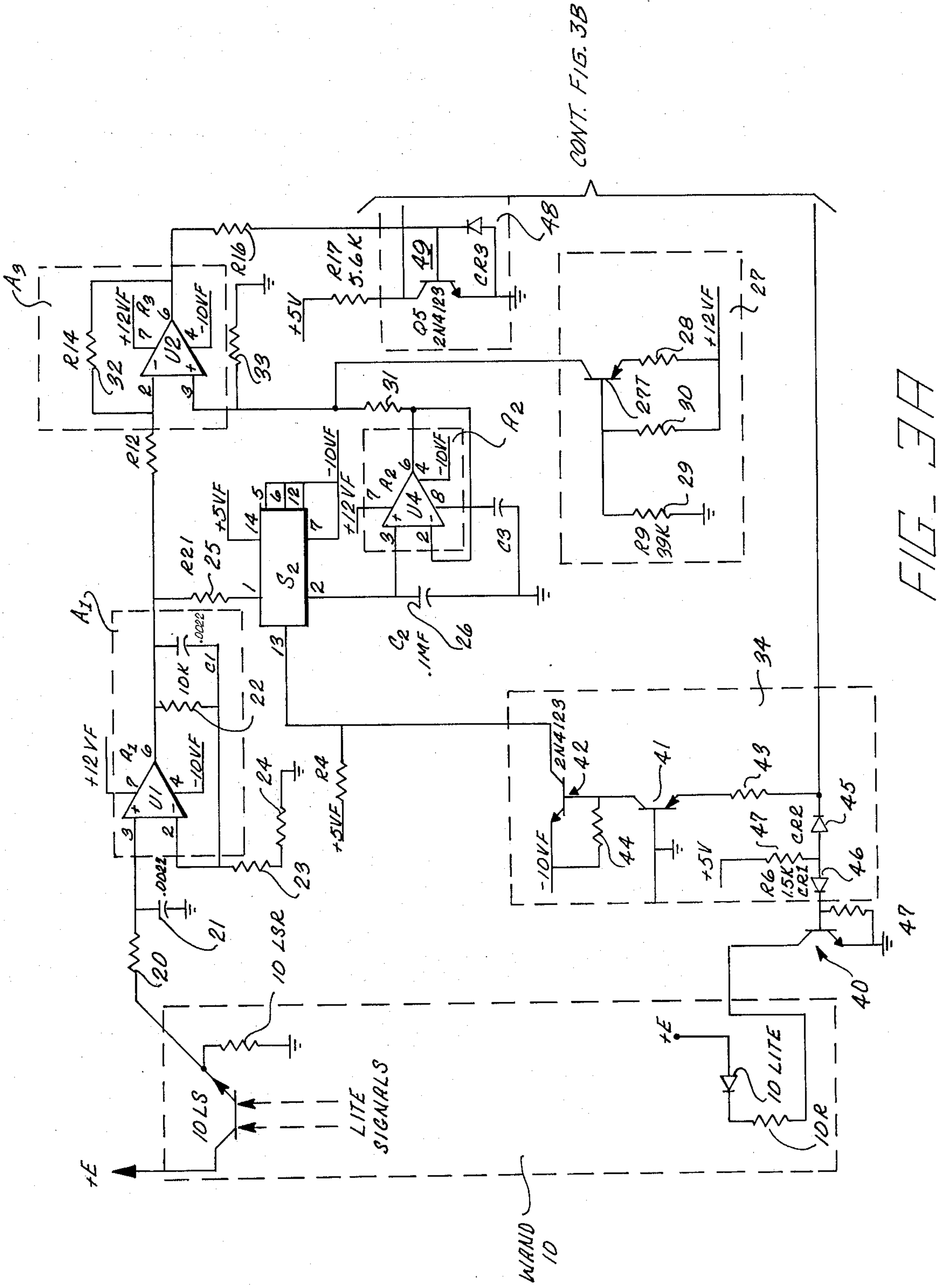
FIGS. 3A and 3B are schematic-block diagrams of a data collection system including the bar coded data reading circuitry for interfacing with the system and entering the sensed bar coded data into the data collection system.
Figure 3B:
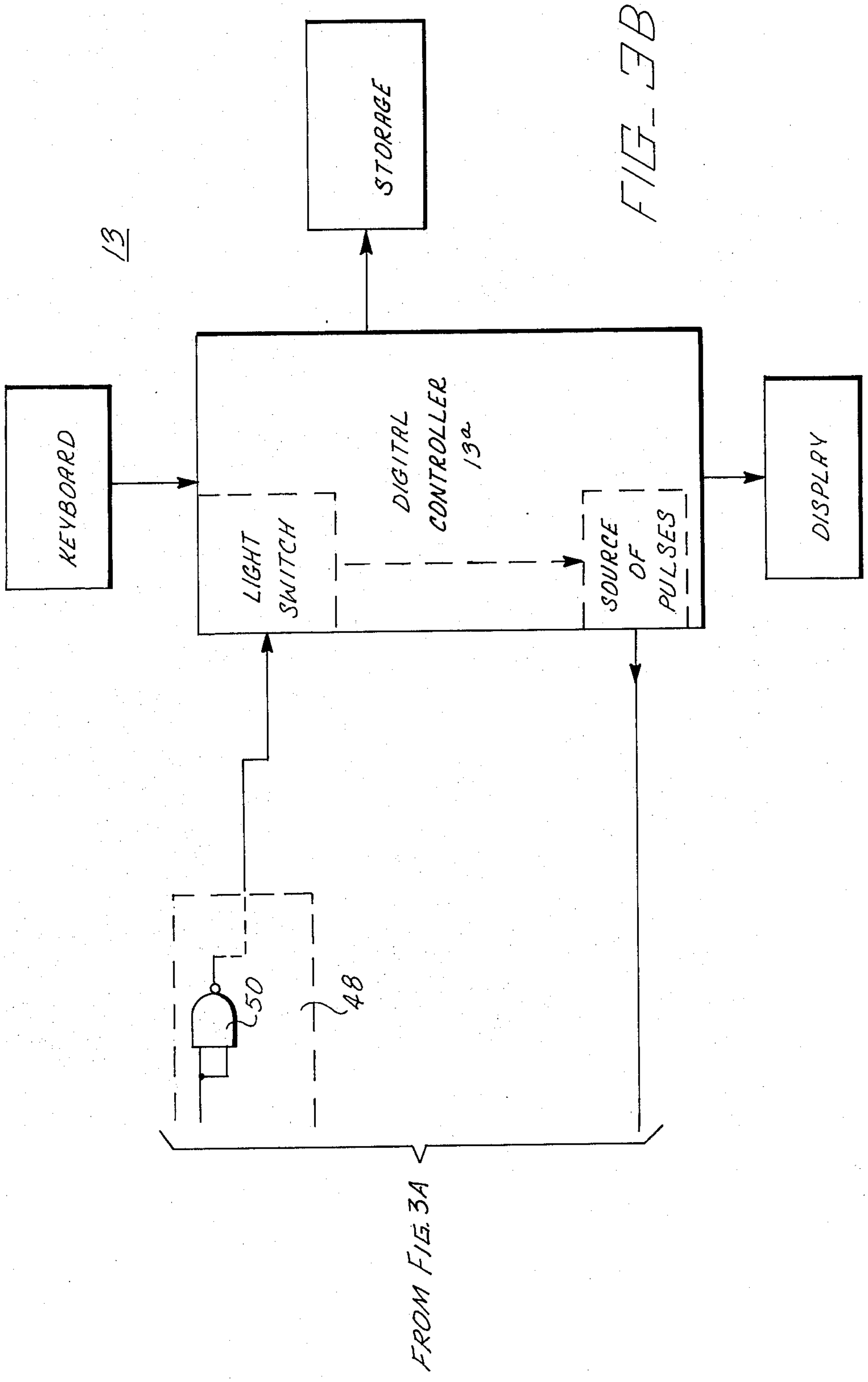

Prior to examining the signal processing circuits for processing the signals from the light sensor, it is necessary to consider the offset voltages introduced into the signals by the light sensor. The light sensor is generally identified in FIG. 2 by a block identified as 10LS as it may be arranged within the housing for the wand 10. Similarly arranged within the wand 10 and adjacent to the light sensor 10LS there is illustrated a block for representing the light source that is identified as 10 Lite. The light sensor 10LS may be a phototransistor that is positioned at the focus of reflective optics to receive the light rays from the source 10 Lite that are reflected from a surface such as the label 11. The blocks 10LS and 10 Lite are schematically illustrated in the circuits of FIG. 3. The light source 10 Lite is illustrated as a light emitting diode having its anode electrode connected to a source of positive potential and its cathode electrode connected to the signal processing circuits by means of a dropping resistor 10R. The light sensor 10LS is illustrated as a phototransistor having its collector electrode connected to a source of positive potential. The emitter electrode is coupled to the signal processing circuits proper. In addition, a dropping resistor 10LSR is coupled between the emitter electrode and ground and is also included within the wand 10. The light rays that are reflected from a surface undergoing sensing by the wand 10 impinge upon the base electrode of the phototransistor 10LS. When there is no radiation or light impinging upon the base of the sensor 10LS, the transistor will pass only a leakage or dark current. When radiation or light strikes the base region of the transistor 10LS, it will cause hole-electron pairs to be generated which will cause a current to flow across the base of transistor 10LS. This will result in a more positive voltage appearing at the emitter electrode than when no radiation strikes the base electrode. The transistor 10 LSR has to be proportioned with respect to the signal processing circuits relative to the offset voltage produced by the dark currents in the phototransistor. It would be desirable to proportion the resistor 10LSR so that it has a small resistance value to minimize the offset by the dark currents produced at the transistor 10LS. Alternatively, a large resistive value for resistor 10LSR is desirable to maximize the signal derived from the sensor 10LSR. The value of the resistance selected for 10LSR therefore is a compromise between the two values. In the elementary configuration shown in FIG. 3, only positive offsets can be realized but it will be recognized by those skilled in the art that more elaborate circuits can be provided that exhibit bipolar offsets.

It should also be noted that the offset voltages may be produced as a result of the inherent characteristics of the bar code itself during the intervals when the areas of the light bars or reflective areas and the dark or absorbing areas are not equal. Furthermore, offset voltages are produced by the amplifiers employed in the signal processing circuits.

With the above structure in mind, then, the detailed circuit organization of the interfacing circuits for processing the signals from the wand 10 to control the energization and de-energization of the light source 10 Lite will be examined in more detail. Basically, the signal processing circuits are handled by means of three operational amplifiers identified by a dotted outline as amplifiers A1, A2 and A3. The operational amplifiers are well known in the art and are commercially available in the form of an integrated circuit or micro-chip. The amplifiers are all arranged in a D.C. coupling circuit and are each provided with two input terminals, identified as a plus (+) and minus (−) input terminal in FIG. 3. For this purpose, an integrated circuit device Type 72741 may be employed as the amplifiers A1 and A3. The amplifier A2 may be an LM308 type of integrated circuit device.

The emitter electrode of the light sensor 10LS is coupled to the positive terminal of the A1 amplifier by means of a series input resistance of relative high value that is identified by the reference numeral 20 while a capacitor 21 is coupled between the positive terminal to ground. The amplifier A1 is further arranged as providing a preselected amount of the amplification of the signals from the sensor 10LS including the unknown D.C. offset signals that are generated by the light sensor 10LS. In particular, the amplifier A1 is further characterized as a potentiometric amplifier having a high input impedance and a known gain that is related to the feedback network associated therewith. The gain of the amplifier A1 is determined by the ratio of the feedback resistor 22 connected between the output terminal of the amplifier A1 and the negative input terminal of the amplifier A1 and the resistors 23 and 24 connected between the negative input terminal of the amplifier A1 in series circuit relationship to ground or a reference potential. Stated mathematically, the gain of the A1 amplifier is representated by the formula $$\frac{R22 + R23 + R24}{(R23 + R24)}$$

wherein R represents the resistance value of the resistors R22, R23 and R24 in ohms. In a typical example, R22 is 10,000 ohms, R23 is 1,000 ohms and R24 is 100 ohms.

The output signal from the amplifier A1 is coupled as an input signal to the negative terminal as the amplifier A3. The amplifier A3 is arranged as a differential amplifier. The positive input terminal for the amplifier A3 is coupled to receive the output signals from amplifier A2. As will be evident from examining FIG, 3, amplifier A2 is arranged as a unity gain amplifier to receive the signal excursions coupled thereto from the output of the amplifier A1. It will be noted that for this purpose there is a direct connection between the output terminal of the amplifier A2 to the negative input terminal of the amplifier. The output signal from the amplifier A1 is coupled to the positive terminal of the amplifier A2 by means of resistor 25 and through a switch identified as the switch S2. The switch S2 may be an electronic switch that is a commercially available integrated circuit device. One such integrated circuit device is identified as Model No. CD4016AE. This A1 output signal is also coupled in parallel circuit relationship with a storage device illustrated as a storage capacitor 26 connected between the positive terminal of the amplifier A2 and ground. In the normal circuit relationship there is a signal coupling path for the signal from the amplifier A1 to the input of the amplifier A2. The operation of the switch S2 is effective to decouple or open the circuit between amplifiers A1 and A2 as will be made evident immediately hereinafter. The arrangement of the amplifier A2 in a unity gain configuration, along with the provision of capacitor 26, renders this circuitry a simple sample and hold circuit. This circuit organization will produce an output signal from the amplifier A2 that corresponds identically to the output signal from the amplifier A1. In this respect it will be noted that when the output signal from the amplifier A1 represents a dark sensor 10LS that this output voltage will represent the unknown D.C. offset introduced into the circuit by means of the sensor 10LS and the amplifier A1. This A1 output signal from the amplifier A2 will then, in the normal operation of the circuitry (when the source 10 Lite is de-energized) will appear as the equivalent signal at the output of the amplifier A2.

There is coupled to the output terminal of the amplifier A2 and in parallel circuit relationship to the positive input terminal to the amplifier A3 a current source identified by the reference numeral 27. The current source 27 is provided to assure that the amplifier A3 output signal has a preselected polarity when the source 10 Lite is de-energized. In the circuit configuration illustrated, the polarity of the output signals from the amplifier A3 will be positive when the light source is de-energized as a result of the provision of the current source 27. The current source 27 comprises a transistor which may be of the 2N4125 type and is identified as the transistor 27T. The emitter electrode of the transistor 27T is connected to a positive source of potential shown as +12 through a resistor 28. The base electrode of the transistor 27T is coupled to ground through a relatively high resistor 29. A resistor 30 is also coupled to the base electrode and to the source of positive potential (+12V.). The collector electrode for the transistor 27T is coupled to the positive input terminal for the amplifier A3.

At this point, it should be recognized that the differential amplifier A3 will amplify the difference between the signals appearing at its two input terminals. With the light source 10 Lite de-energized and in view of the above discussion, it will be recognized that the signals normally passed to the differential amplifier A3 will be equal and under these conditions its output signal would be zero, however, certain offset voltages are produced as a result of the amplifiers A2 and A3 themselves and the tolerances of the resistors 32 and 33 for the amplifier A3 arranged therewith. The resistor 32 is a feedback resistor coupled between the output and the negative input terminals of the amplifier A3 while the resistor 33 is coupled to the positive input terminal of the amplifier A3 and ground. It will also be noted that the gain of the amplifier A3 is proportioned by the ratio of the resistance values for the resistor R32 relative to the resistor R33. Under these conditions, then, the current source 27 assures that the output signal from the amplifier A3 is at a positive voltage level so as to be readily recognizable to the digital controller $13^a$. The magnitude of the current provided by the source 27 for this purpose will be considered immediately hereinafter.

If it is assumed that the source 10 Lite is energized, the circuit is arranged so that the switch control network 34 controls the energization of the source 10 Lite and simultaneously operates the switch S2 to decouple the amplifiers A1 and A2 during the intervals that the source 10 Lite is energized. Under these operating conditions, the output voltage from the amplifier A2 will remain equal to the output voltage A1 that existed before the source 10 Lite was energized. If the wand 10 is placed opposite a reflective surface, the output voltage from the amplifier A1 will go positive and thereby cause the output of the differential amplifier A3 to go negative for signalling to the digital controller $13^a$ that the wand is in a position to present the bar coded data to the data collection system 13. In response, then, to the presence of a negative signal at the output of the amplifier A3, the source 10 Lite will be maintained energized so that the bar coded data on the label 11 may be read. This condition prevails until the wand 10 is moved beyond the bar coded data on the label 11 onto a non-reflective surface thereby causing the switch control network 34 to de-energize the source 10 Lite and operate the switch S2 to once again couple the amplifiers A1 and A2.

At this point it should be noted that the change in the output level of the signal from the amplifier A1 in response to the reflected light signal will be known. Accordingly, the current source 27 can be proportioned to provide a bias equivalent to one-half of the minimum change. This will assure that the alternating dark and light bars on the bar coded label 11 will be transmitted as positive and negative voltages from the output of the amplifier A3. The DC coupling provided throughout the signal amplifier processing circuits is maintained and thereby avoids the variations in thresholds that would be encountered when A.C. coupling is employed.

To control the energization and de-energization of the source 10 Lite the switching control network 34 energizes and de-energizes a switching transistor 40. For this purpose the switching transistor 40 has its emitter electrode connected directly to ground and its collector electrode connected to the light resistor 10R. The base electrode is coupled to receive the switching signals through the switching control network 34. The switching network is responsive to the pulses from the digital controller $13^a$ for simultaneously controlling the switching or conductive conditions of the switch S2 and the transistor 40. For this purpose, the pulses from the digital controller $13^a$ are directly coupled to a pair of transistors arranged with the input for the switch S2 identified as 13. The transistors are identified as the transistor 41 which is responsive to the pulses delivered by the digital controller $13^a$ and its output is connected to the transistor 42 which is coupled to control the switch S2. To this end the emitter electrode of the transistor 41 is connected through a resistor 43 to the source of pulses and with its base electrode connected to ground. The collector electrode of the transistor 41 is connected directly to the base electrode for the transistor 42. The emitter electrode for the transistor 42 is connected to the source of negative potential shown as -10. A resistor 44 is coupled between the negative potential source L-10 and the base electrode of the transistor 42. The collector electrode for the transistor 42 is connected directly to the 13 terminal of the switch S2, as illustrated. The pulses from the controller $13^a$ are also coupled to a pair of reverse oriented diodes 45 and 46. The anode electrode for the diodes 45 and 46 are connected in common with a resistor 47 having its opposite terminal coupled to a source of positive potential. The cathode electrode for the diode 45 is coupled in common with the input end of the resistor 43. The cathode electrode for the diode 46 is coupled to the base electrode for the switching transistor 40. A resistor 47 is also coupled between the base electrode for the transistor 40 and ground. It should be recognized that in the normal circuit operation no pulses are received from the digital controller $13^a$ and the switching transistor 40 maintains the source 10 Lite de-energized. Upon the receipt of a pulse at the base of the transistor 40, its conductive condition is changed so as to cause it to conduct and thereby energize the light emitting diode 10 Lite. At the same time the conductive condition of transistors 41 and 42 are reversed so as to operate the switch S2 to decouple the amplifiers A1 and A2.

The structure for the digital controller $13^a$ was briefly described hereinabove. It will be recognized that the signals from the amplifier A3 are processed by the digital controller $13^a$ for periodically applying pulses to the switch control network 34 to energize and de-energize the source 10 Lite. In particular, the signals received from the output of the amplifier A3 are coupled into the digital controller $13^a$ by means of a logic circuit 48. The logic circuit includes a switching transistor 49 having its base electrode connected directly to the output of the amplifier A3. The collector electrode is connected into an isolating gate that is illustrated as a NAND element 50 but is not employed for that purpose. The emitter electrode for the transistor 49 is connected directly to ground and the output from the logic network 48 is applied to the digital controller $13^a$. At this point, it will be recognized that the signals applied to the digital controller $13^a$ are the binary coded signals that have opposite polarities. The signals can be considered as being applied to a "light switch" which is effective for controlling the energization or de-energization of the source of pulses that are derived from the controller and applied to the switching network 34. As indicated hereinabove, the sensing of a dark surface or nonreflective surface will de-energize the source 10 Lite while the light switch of the controller will be effective for maintaining the light energized in response to the sensing of a reflective surface.

It should now be evident that the present invention has advanced the state of the art through the provision of simple interfacing circuits for an optical wand adapted to read bar coded data for entry into a portable, battery operated data collection system. The interfacing circuit controls the energization of the light source to minimize battery drain and compensates with simple D.C. coupled circuits for any offset voltages generated in the system.

What is claimed is:

1. Apparatus for optically reading bar coded data wherein the binary bits are encoded in terms of bars of different widths of the same optical characteristic separated by areas of the opposite optical characteristic comprising optical sensing means for producing electrical signals representative of the optical characteristic of a surface presented thereto upon the production of relative movement between the surface and the sensing means, said sensing means having a normally de-energized light source and a light sensor for receiving the light rays from the light source reflected from the surface being sensed, and control circuit means including means for automatically and periodically energizing the light source coupled to be responsive to the sensor signals and maintaining the energization of the light source in response to a sensor signal of one kind and automatically de-energizing the light source in response to a sensor signal of the other kind.

2. Apparatus for optically reading bar coded data as defined in claim 1 wherein the light sensor and the control circuit means are differentially D.C. coupled thereby avoiding varying signal thresholds.

3. Apparatus for optically reading bar coded data wherein the binary bits are encoded in terms of bars of different widths of the same optical characteristic separated by areas of the opposite optical characteristic comprising optical sensing means for producing electrical signals representative of the optical characteristic of a surface presented thereto upon the production of relative movement between the surface and the sensing means, said sensing means having a normally de-energized light source and a light sensor for receiving the light rays from the light source reflected from the surface being sensed, the sensor electrical signals includes an unknown D.C. offset voltage, first amplifying circuit means coupled to be responsive to the signals from the light sensor including the offset voltages, second amplifying means normally coupled to receive the output signals from the first amplifying means and providing an output signal corresponding thereto for preselected periods, differential amplifying circuit means coupled to be responsive to the output signals from the first and second amplifying circuit means and providing output signals representative of the reflective characteristics of the sensed surface, and switching circuit means coupled to the light source for automatically and periodically energizing the light source for a preselected intervals and decoupling the first and second amplifying means during the intervals the light source is energized.

4. Apparatus for optically reading bar coded data as defined in claim 3 wherein said second amplifying means is a unity gain operational amplifier having signal storage means coupled in the circuit with the output signal from the first amplifying means at the input terminal of the second amplifying means.

5. Apparatus for optically reading bar coded data as defined in claim 3 wherein the signal storage means is a capacitor having one terminal connected in parallel circuit relationship to said input terminal and having its other terminal connected to a point of reference potential.

6. Apparatus for optically reading bar coded data as defined in claim 3 wherein the output signal from the second amplifying means is coupled in parallel circuit relationship with a current source to provide an input signal to the differential amplifying circuit of a preselected polarity when the light source is de-energized to thereby assure that the sensed surfaces of opposite optical characteristic provide output signals from the differential amplifier that are binary coded.

7. Apparatus for optically reading bar coded data as defined in claim 6 wherein the binary coded output signals are signals of opposite polarity.

8. Apparatus for optically reading bar coded data as defined in claim 3 wherein said first amplifying means is an operational amplifier having a high input impedance and is D.C. coupled to the light sensor.

9. Apparatus for optically reading bar coded data as defined in claim 3 including means for automatically and periodically energizing the light source and coupled to be responsive to the switching circuit means for energizing and de-energizing the light source in response thereto.

10. Apparatus for optically reading bar coded data as defined in claim 6 including means coupled to be responsive to said binary signals from the differential amplifier means for periodically energizing and de-energizing the light source in response to changes in the binary character of the signals.

11. Apparatus for optically reading bar coded data as defined in claim 3 wherein said light source is characterized as having a fast response time.

12. Apparatus for optically reading bar coded data as defined in claim 11 wherein said light source is a light emitting diode.

13. Apparatus for optically reading bar coded data as defined in claim 3 wherein said amplifying means are D.C. coupled throughout.

14. Apparatus for optically reading bar coded data wherein the binary bits are encoded in terms of bars of different widths of the same optical characteristic separated by areas of the opposite optical characteristics comprising optical sensing means for producing electrical signals representative of the reflective characteristic of a surface upon the production of relative movement between the two, said sensing means having a normally de-energized light source and a light sensor, the electrical signals produced including an unknown D.C. offset voltage, amplifying means coupled to be responsive to the signals from the sensing means including the offset voltages, differential amplifying means for receiving the signals from the amplifying means, sample and hold amplifying circuit means normally coupled to receive the output signals from said amplifying means and for coupling the output signals to said differential amplifying means, controller means coupled to be responsive to the output signals from said differential amplifying means for controlling the energization of the light source, said controller means providing a series of pulses adapted for automatically and periodically energizing the light source, and switching means coupled to be responsive to the series of pulses for switchably energizing the light source in response to the operation of the switching means and coupled between the output of said amplifying means and the input to said sample hold amplifying circuit to switchably de-couple said sample and hold circuit in response to the operation of the switching means, said controller means being effective for maintaining the switching means energized in response to a sensed reflective surface and for de-energizing the light source in response to a sensed absorptive surface.

15. Apparatus for optically reading bar coded data wherein the binary bits are encoded in terms of bars of different widths of the same optical characteristic separated by areas of the opposite optical characteristic comprising optical sensing means for producing electrical signals representative of the optical characteristic of a surface presented thereto upon the production of relative movement between the surface and the sensing means, said sensing means having a normally de-energized light source and a light sensor for receiving the light rays from the light source reflected from the surface being sensed, differentially D.C. amplifying circuit means coupled to be responsive to the signals from the light sensor and providing binary coded signals representative of the optical characteristics of the sensed surface, and control circuit means including means for automatically and periodically energizing the light source coupled to be responsive to the binary coded signals and maintaining the energization of the light source in response to a binary signal of one kind and de-energizing the light source in response to a binary signal of the other kind.

16. A method of optically reading bar coded data wherein the binary bits are encoded in terms of bars of different widths of the same optical characteristics and separated by areas of the opposite optical characteristic including the steps of providing an optical wand having a light source and a light sensor for reading bar coded data, moving the wand over a surface having bar coded data recorded thereon, automatically and periodically energizing the light source in the wand, electrically determining the reflective characteristic of the surface sensed by the wand and producing electrical signals corresponding to the sensed reflective characteristics, and utilizing the electrical signals for de-energizing the light source if no reflective surface is sensed by the wand.

17. A method of optically reading bar coded data as defined in claim 16 including the steps of utilizing the electrical signals representative of a sensed reflective characteristic to maintain the light source energized to thereby permit reading of the bar coded data by the energized wand being moved over the bar coded data.

18. A method of optically reading bar coded data as defined in claim 17 including the step of utilizing the non-reflective elctrical signals for de-energizing the light source after the wand is moved past the bar coded data.

19. A method of optically reading a bar coded data wherein binary bits are encoded in terms of bars of different widths of the same optical characteristics separated by areas of the opposite optical characteristic comprising the steps of producing relative movement between the bar coded data and an optical bar coded sensor for producing electrical signals representative of the sensed binary bits, the sensor including a light source and a light sensor for receiving the light rays reflected from the bar coded data, maintaining the light source normally dark, automatically and periodically energizing the light source at a preselected rate, determining the reflective characteristic of the surface exposed to the sensor, if no reflective surface is sensed, automatically de-energizing the light source, if a reflective surface is sensed, maintaining the light source energized, and generating the electrical signals representative of the bar coded data while the light source is energized.

20. A method of optically reading bar coded data as defined in claim 19 including the steps of repeating the steps of determining the sensed reflective characteristic a preselected period after the light source is de-energized as a result of sensing a non-reflective surface.

21. A method of optically reading bar coded data wherein the binary bits are encoded in terms of bars of different widths of the same optical characteristics and separated by areas of the opposite characteristic including the steps of providing an optical wand having a light source and a light sensor responsive to the light rays from said source reflected from a surface the wand is passed over, arranging the light source to be normally de-energized, periodically energizing the light source in the wand, generating electrical signals by means of the light sensor when the light source is energized representative of the light reflective or light absorptive characteristics of the surface the wand is passed over, processing the thus generated electrical signals to produce binary coded signals representative of the light characteristic of the surface the wand is passed over, and interrogating the binary signals representative of the sensed light characteristic to determine the surface characteristic sensed and controlling the light source by either de-energizing the light source in response to a binary coded signal representative of an absorptive light surface or maintaining the light source energized in response to a binary coded signal representative of a reflective light source to allow the bar coded data to be read by the energized wand.

22. A method of optically reading as defined in claim 21 including the steps of de-energizing the light source after the bar coded data is read in response to sensing a non-reflective surface, and repeating the step of energizing the light source a preselected time interval after the sensing of a non-reflective surface to re-determine the light characteristic of the surface the wand is passed over.

23. A method of optically reading bar coded data comprising the steps of providing an optical sensor having a normally de-energized light source and light sensor adapted to receive the light rays reflected from a surface, producing relative movement between a surface having bar coded data and the optical sensor for reading the bar coded data, automatically and periodically energizing the light source to generate signals at the sensor representative of the reflective characteristic of the surface sensed, amplifying the sensor signals, rejecting any D.C. offset voltage introduced into the amplified sensor signal, and producing binary coded signals representative of the reflective characteristic of the sensed surface including the sensed bar coded data.

24. A method of optically reading bar coded data as defined in claim 23 including the steps of determing the binary character of the binary signal and de-energizing the light source if a non-reflective surface has been sensed or maintaining the energization of the light source if a reflective surface has been sensed.

* * * * *